(12) United States Patent
Yorozu

(10) Patent No.: US 11,204,083 B2
(45) Date of Patent: Dec. 21, 2021

(54) BALL SCREW DEVICE AND ELECTRIC POWER STEERING DEVICE

(71) Applicant: NSK LTD., Tokyo (JP)

(72) Inventor: Yusuke Yorozu, Kanagawa (JP)

(73) Assignee: NSK LTD., Tokyo (JP)

( * ) Notice: Subject to any disclaimer, the term of this patent is extended or adjusted under 35 U.S.C. 154(b) by 546 days.

(21) Appl. No.: 16/073,409

(22) PCT Filed: Feb. 5, 2018

(86) PCT No.: PCT/JP2018/003820
§ 371 (c)(1),
(2) Date: Jul. 27, 2018

(87) PCT Pub. No.: WO2018/147229
PCT Pub. Date: Aug. 16, 2018

(65) Prior Publication Data
US 2019/0360569 A1 Nov. 28, 2019

(30) Foreign Application Priority Data
Feb. 13, 2017 (JP) .............................. JP2017-024174

(51) Int. Cl.
*F16H 25/24* (2006.01)
*F16H 25/22* (2006.01)
*B62D 5/04* (2006.01)

(52) U.S. Cl.
CPC ....... *F16H 25/2219* (2013.01); *B62D 5/0448* (2013.01); *F16H 25/24* (2013.01)

(58) Field of Classification Search
CPC .... F16H 25/2219; F16H 25/24; B62D 5/0448
See application file for complete search history.

(56) References Cited

U.S. PATENT DOCUMENTS

| 5,664,459 A | * | 9/1997 | Muhleck | ............. | F16H 25/2219 |
| | | | | | 74/424.87 |
| 2015/0151780 A1 | * | 6/2015 | Fujita | .................. | F16H 25/2219 |
| | | | | | 74/424.87 |

FOREIGN PATENT DOCUMENTS

| JP | 2004-036644 A | 2/2004 |
| JP | 2013-024321 A | 2/2013 |
| JP | 2014-077459 A | 5/2014 |
| JP | 2017-002978 A | 1/2017 |

OTHER PUBLICATIONS

International Search Report for PCT/JP2018/003820 dated Mar. 27, 2018.

* cited by examiner

*Primary Examiner* — Randell J Krug
(74) *Attorney, Agent, or Firm* — Sughrue Mion, PLLC

(57) ABSTRACT

A ball screw device includes a screw shaft having a first thread groove on an outer peripheral surface and a nut having a second thread groove provided on an inner peripheral surface, a notch provided on an end face, and a return hole provided on a bottom surface of the notch orthogonal to an axial direction of the screw shaft and passing through in the axial direction. An end deflector fits into the notch. The nut includes a curved surface portion at a position of a lateral surface of the notch between the second thread groove and the return hole. In a first section, the curved surface portion includes a portion that draws an arc centered at a point positioned outside the second thread groove in a radial direction around a rotation axis of the nut.

7 Claims, 15 Drawing Sheets

BALL SCREW DEVICE AND ELECTRIC POWER STEERING DEVICE

CROSS REFERENCE TO RELATED APPLICATIONS

This application is a National Stage of International Application No. PCT/JP2018/003820 filed Feb. 5, 2018, claiming priority based on Japanese Patent Application No. 2017-024174 filed Feb. 13, 2017.

TECHNICAL FIELD

The present invention relates to a ball screw device and an electric power steering device.

BACKGROUND

Known as a device that converts a rotary movement into a translatory movement is a ball screw device. A ball screw device includes a screw shaft, a nut, and a plurality of balls. For example, Patent Literature 1 describes an example of a ball screw device. A ball screw device described in Patent Literature 1 includes a rolling groove formed between a screw shaft and a nut, a circulating piece (an end deflector) fitted into a notch on a nut end face, and a ball returning passage passing through the nut in an axial direction. A plurality of balls circulates endlessly by the rolling groove, a ball circulating passage formed by the notch on the nut end face and the end deflector, and the ball returning passage.

CITATION LIST

Patent Literature

Patent Literature 1: JP 2004-36644 A

SUMMARY

Technical Problem

However, in the ball screw device in Patent Literature 1, when the balls enter the rolling groove from the ball circulating passage, the balls may slightly deviate from a traveling direction. Therefore, the balls may collide with an edge of a thread groove of the nut.

The present invention has been made in view of the above problems, and an object thereof is to provide a ball screw device capable of smoothing a movement of a ball.

Solution to Problem

To achieve the above object, a ball screw device according to one embodiment of the present invention includes a screw shaft that has a first thread groove on an outer peripheral surface, a nut that has a second thread groove provided on an inner peripheral surface, a notch provided on an end face, and a return hole provided in a bottom surface of the notch orthogonal to an axial direction of the screw shaft and passing through in the axial direction, a plurality of balls that roll between the first thread groove and the second thread groove, and an end deflector that fits into the notch. The nut includes a curved surface portion at a position of a lateral surface of the notch between the second thread groove and the return hole, and the curved surface portion includes, in a first section obtained by cutting the nut with a plane orthogonal to the axial direction and passing through the second thread groove and the notch, a portion that draws an arc centered at a point positioned outside the second thread groove in a radial direction around a rotation axis of the nut.

Consequently, a ball is moved toward a first thread groove by a curved surface potion, when the ball enters a second thread groove from a notch side. Thus, the ball touches the first thread groove before entering the second thread groove from the notch side and is guided to the first thread groove. The ball guided to the first thread groove passes through a middle of the first thread groove. This suppresses collision between the ball and an edge of the nut. Therefore, the ball screw device can smooth a movement of the ball. The ball screw device can also suppress generation of sound due to the collision of the ball.

As a desirable embodiment of the ball screw device, the nut preferably includes a first concave portion around an edge of the return hole of the bottom surface. This results in smooth movements when the ball goes in and out of a return hole.

As a desirable embodiment of the ball screw device, a surface of the first concave portion preferably includes, in a second section obtained by cutting the nut with a plane orthogonal to the bottom surface and passing through a center of the return hole, a portion that draws an arc centered at a point positioned inside the return hole in the radial direction. This leads to smoother movements of the ball from the curved surface portion toward the return hole and from the return hole toward the curved surface portion.

As a desirable embodiment of the ball screw device, the nut preferably includes a second concave portion at an end of the bottom surface on a side of the second thread groove. This increases thickness of a portion of an end deflector corresponding to a second concave portion. Therefore, durability of the end deflector is improved.

As a desirable embodiment of the ball screw device, in the first section, a first tangent line which is a tangent line at an end of the curved surface portion on a side away from the second thread groove is preferably equal to a tangent line of the return hole. This results in smooth movements of the ball from the curved surface portion toward the return hole and from the return hole toward the curved surface portion.

As a desirable embodiment of the ball screw device, the nut preferably includes a planar portion positioned on a side opposite to the curved surface portion of a lateral surface of the notch across the bottom surface, and a straight line including the planar portion is preferably not parallel to the first tangent line in the first section. This makes it easier to dispose a position of the return hole inside in a radiation direction. Therefore, it is possible to shorten a distance from the second thread groove to the return hole.

An electric power steering device according to one embodiment of the present invention includes the ball screw device. Consequently, an electric power steering device can smooth a movement of a member to which an auxiliary steering force is transmitted.

Advantageous Effects of Invention

According to the present invention, it is possible to provide a ball screw device capable of smoothing a movement of a ball.

DESCRIPTION OF EMBODIMENTS

The present invention will be described below in detail with reference to the drawings. The present invention is not limited by an embodiment described below (hereinafter referred to as the embodiment) for carrying out the invention. Components in the below embodiment include those easily assumed by those skilled in the art, substantially identical, and in the scope of so-called equivalents. The components disclosed in the embodiments can be appropriately combined.

Embodiments

Figure 1:
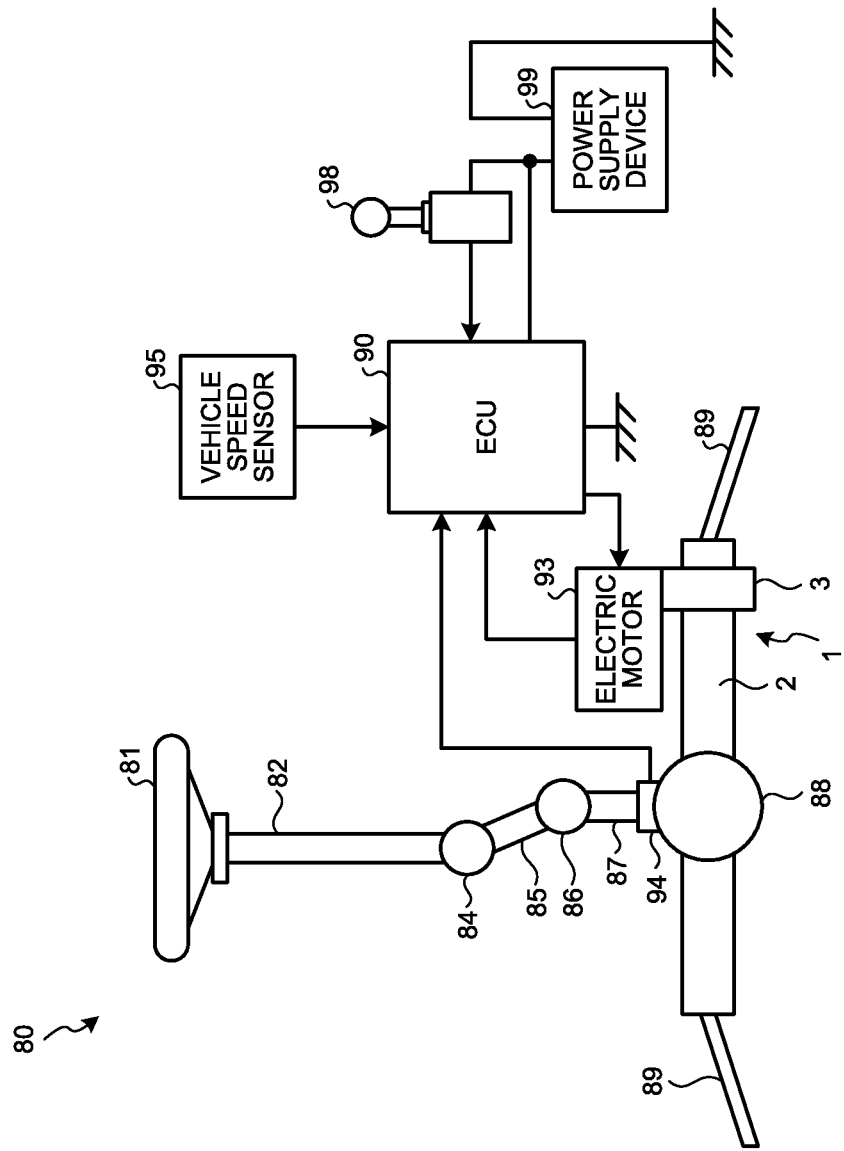
FIG. 1 is a pattern diagram illustrating an outline of a steering device according to the present embodiment.
Figure 2:
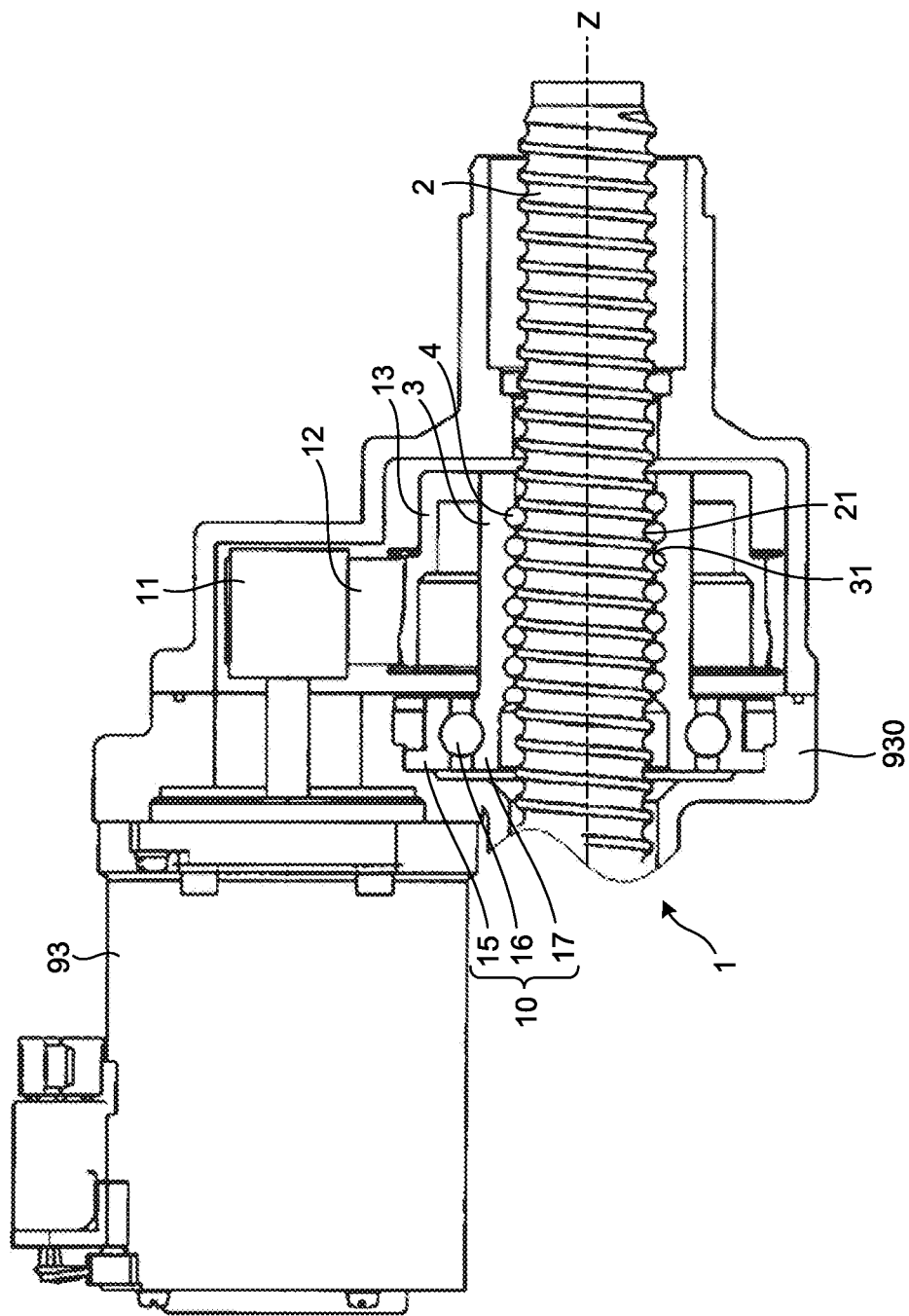
FIG. 2 is a sectional view of a periphery of a ball screw device according to the present embodiment.

FIG. 1 is a pattern diagram illustrating an outline of a steering device according to the present embodiment. FIG. 2 is a sectional view of a periphery of a ball screw device according to the present embodiment. As illustrated in FIG. 1, an electric power steering device 80 includes, in order in which a force provided by an operator is transmitted, a steering wheel 81, a steering shaft 82, a universal joint 84, a lower shaft 85, a universal joint 86, a pinion shaft 87, a pinion 88, a ball screw device 1, and an electric motor 93.

As illustrated in FIG. 1, the steering wheel 81 is coupled to the steering shaft 82. One end of the steering shaft 82 is coupled to the steering wheel 81, and the other end of the steering shaft 82 is connected to the universal joint 84. The lower shaft 85 is coupled to the steering shaft 82 via the universal joint 84. One end of the lower shaft 85 is coupled to the universal joint 84, and the other end thereof is coupled to the universal joint 86. One end of the pinion shaft 87 is coupled to the universal joint 86, and the other end thereof is coupled to the pinion 88.

As illustrated in FIGS. 1 and 2, the ball screw device 1 includes a rack 2 (screw shaft), a nut 3, and a ball 4. The pinion 88 engages with the rack 2. The pinion 88 and the rack 2 convert a rotary movement transmitted to the pinion shaft 87 into a translatory movement. The rack 2 is coupled to a tie rod 89. Moving of the rack 2 changes an angle of a wheel.

The electric motor 93 is, for example, a brushless motor, but may be a motor with a brush (slider) and a commutator. As illustrated in FIG. 2, the electric motor 93 is fixed to a housing 930. A small pulley 11, for example, is attached to a shaft of the electric motor 93. The small pulley 11 is coupled to a large pulley 13 via a belt 12. The large pulley 13 is attached to the nut 3. Therefore, when the electric motor 93 is driven, the nut 3 rotates around a rotation axis Z.

As illustrated in FIG. 2, the rack 2 passes through the nut 3. The nut 3 is fixed to the housing 930 via a bearing 10. The bearing 10 includes an outer ring 15, an inner ring 17, and a rolling element 16 positioned between the outer ring 15 and the inner ring 17. The outer ring 15 is fixed to the housing 930. The inner ring 17 is integrally formed with the nut 3, for example. The nut 3 is positioned in an axial direction of the rack 2 (hereinafter simply referred to as the axial direction). In other words, the nut 3 can rotate but does not move in the axial direction.

As illustrated in FIG. 2, a plurality of balls 4 is disposed between a first thread groove 21 on an outer peripheral surface of the rack 2 and a second thread groove 31 on an inner peripheral surface of the nut 3. The balls 4 circulate endlessly between the first thread groove 21 and the second thread groove 31. When the nut 3 rotates, the rack 2 moves in the axial direction. The ball screw device 1 converts a rotary movement into a translatory movement. Torque generated by the electric motor 93 reduces a force required for moving the rack 2. This means that a rack assist type is employed in the electric power steering device 80.

As illustrated in FIG. 1, the electric power steering device 80 includes an electronic control unit (ECU) 90, a torque sensor 94, and a vehicle speed sensor 95. The electric motor 93, the torque sensor 94, and the vehicle speed sensor 95 are electrically connected to the ECU 90. The torque sensor 94 is attached to the pinion 88, for example. The torque sensor 94 outputs steering torque transmitted to the pinion 88 to the ECU 90 through controller area network (CAN) communication. The vehicle speed sensor 95 detects a running speed (vehicle speed) of a vehicle body on which the electric power steering device 80 is mounted. The vehicle speed sensor 95 is provided on a vehicle body and outputs a vehicle speed to the ECU 90 through CAN communication.

The ECU 90 controls operation of the electric motor 93. The ECU 90 acquires signals from the torque sensor 94 and the vehicle speed sensor 95, respectively. In a state where an ignition switch 98 is on, power is supplied to the ECU 90 from a power supply device 99 (for example, a vehicle-mounted battery). The ECU 90 calculates an auxiliary steering command value based on steering torque and a vehicle speed. The ECU 90 adjusts a power value to be supplied to the electric motor 93 based on the auxiliary steering command value. The ECU 90 acquires information on an induced voltage from the electric motor 93 or information output from a resolver or the like provided in the electric motor 93. By controlling the electric motor 93 by the ECU 90, a force required for operating the steering wheel 81 is reduced.

Figure 3:
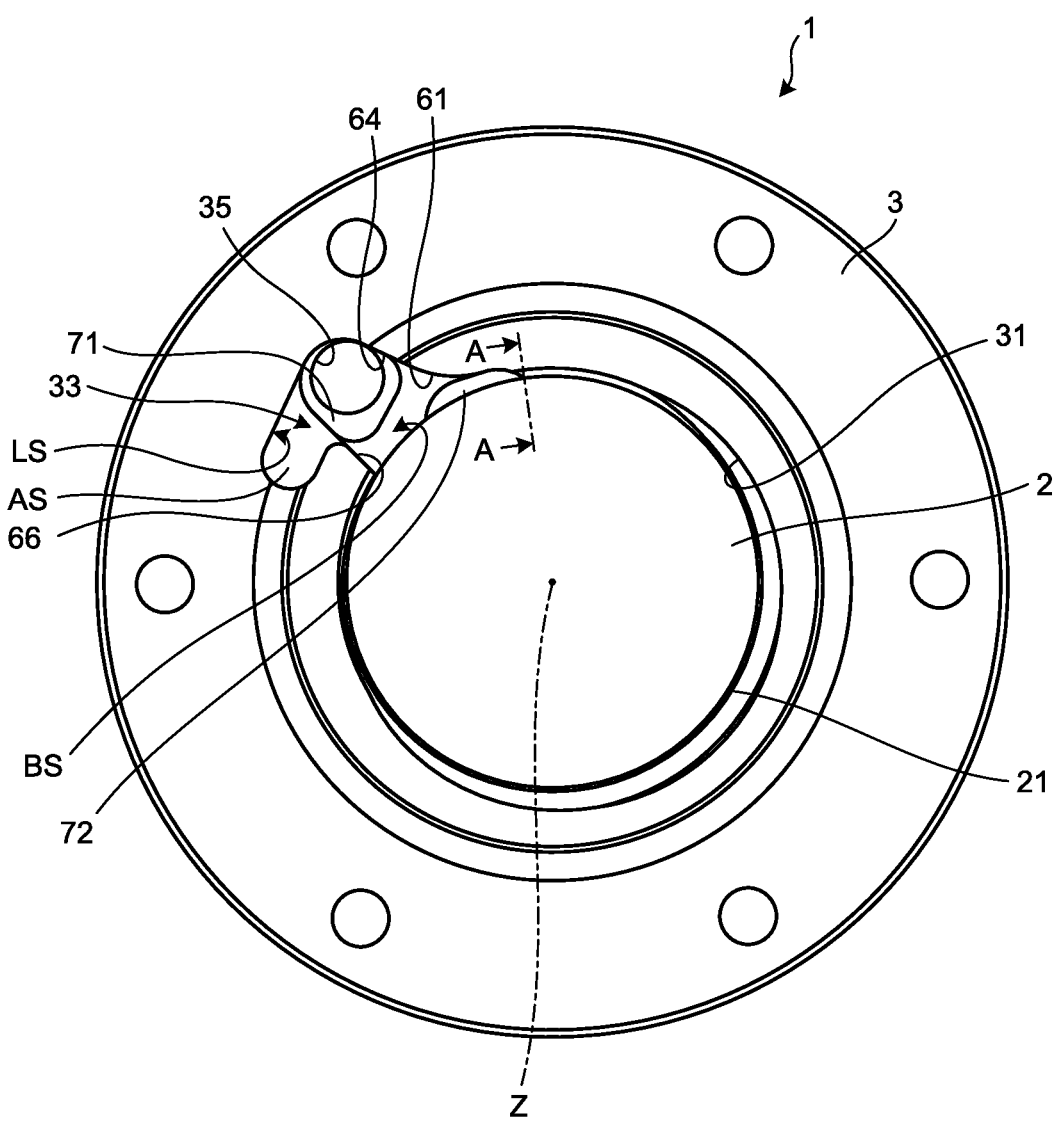
FIG. 3 is a front view of the ball screw device according to the present embodiment.
Figure 4:
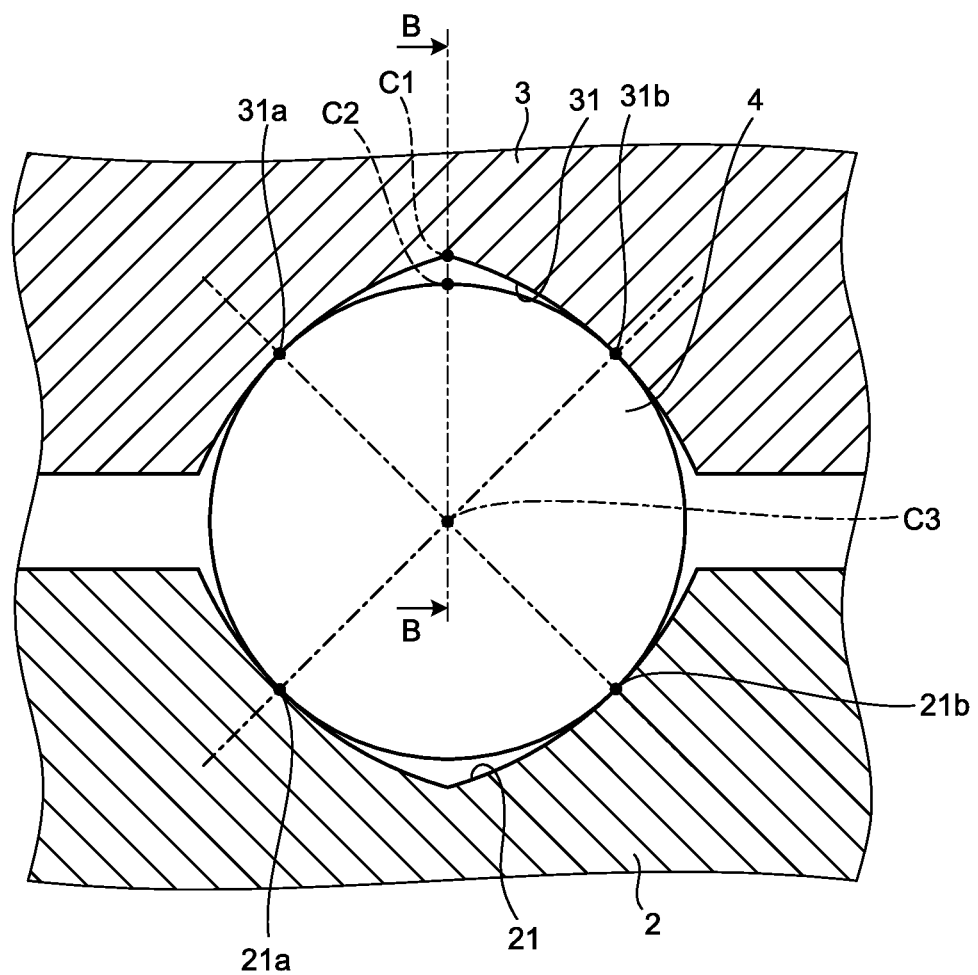
FIG. 4 is an A-A sectional view in FIG. 3.
Figure 5:
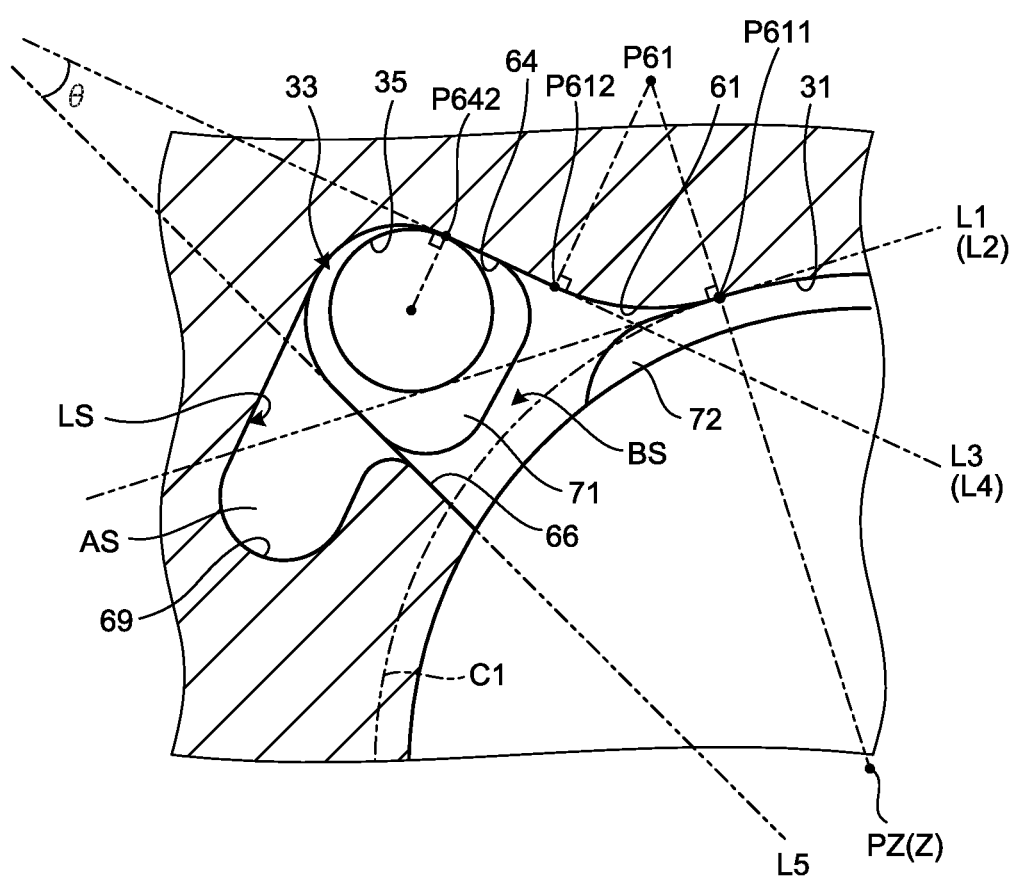
FIG. 5 is a B-B sectional view in FIG. 4.
Figure 6:
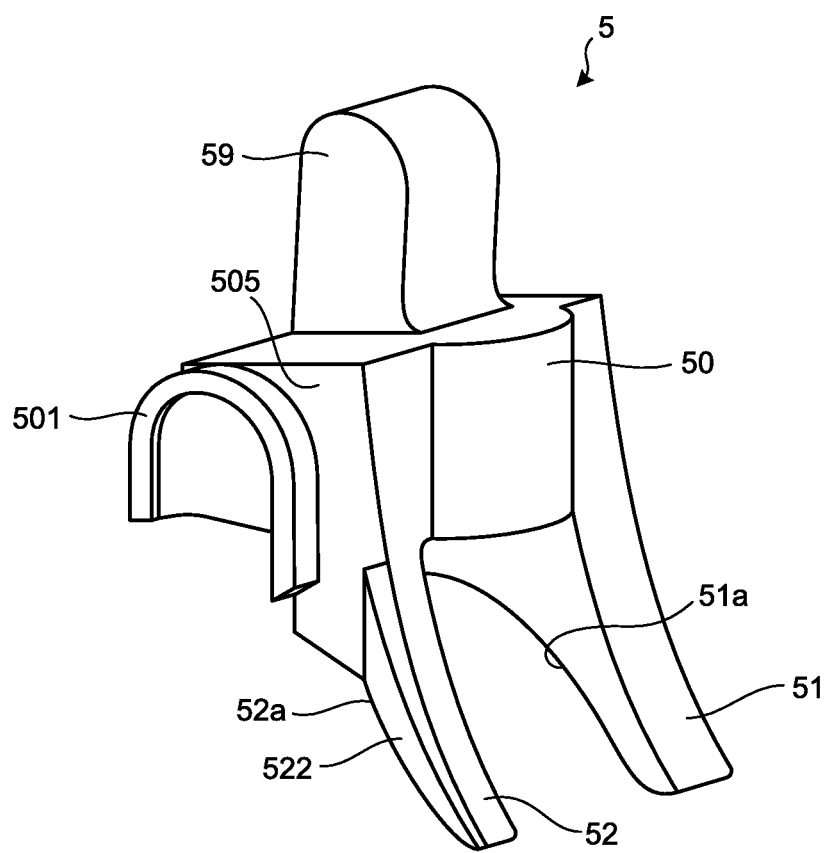
FIG. 6 is a perspective view of an end deflector according to the present embodiment.
Figure 7:
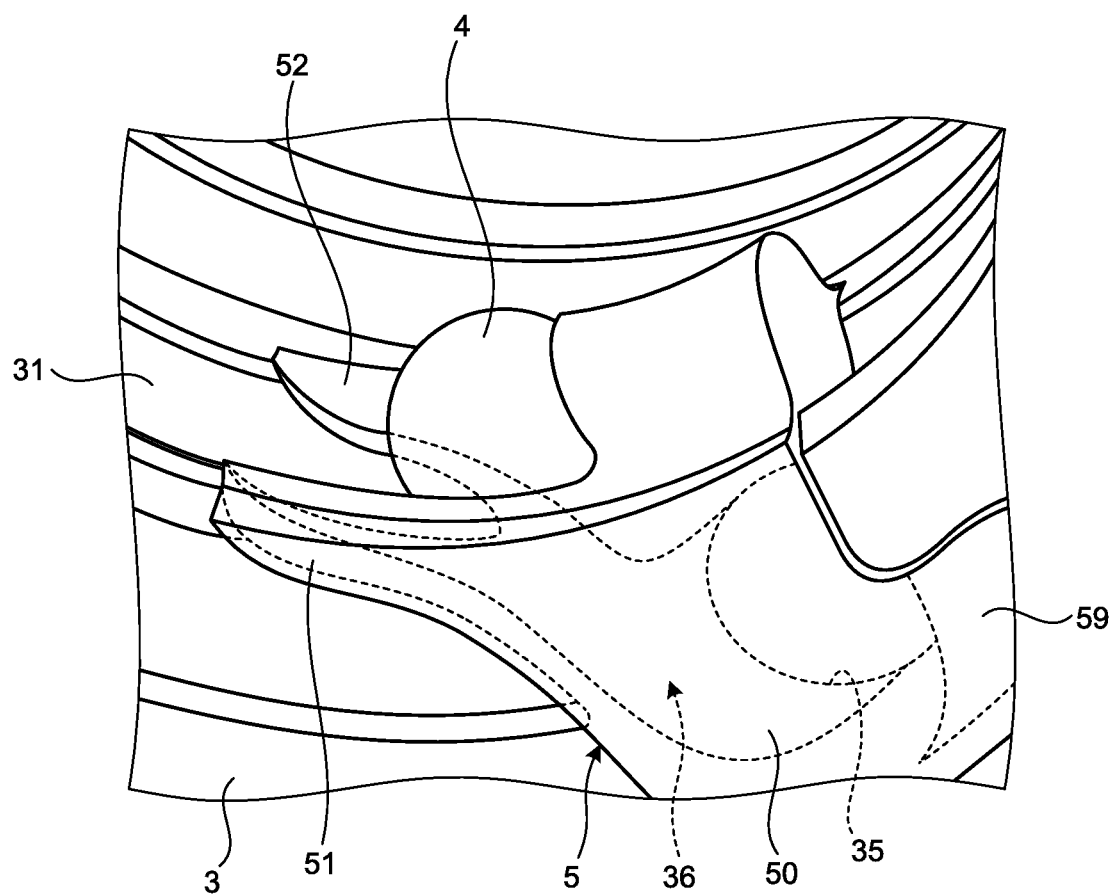
FIG. 7 is a perspective view of a nut and the end deflector according to the present embodiment.

FIG. 3 is a front view of the ball screw device according to the present embodiment. FIG. 4 is an A-A sectional view in FIG. 3. FIG. 5 is a B-B sectional view in FIG. 4. FIG. 6 is a perspective view of an end deflector according to the present embodiment. FIG. 7 is a perspective view of a nut and the end deflector according to the present embodiment.

As illustrated in FIG. 3, the nut 3 includes the second thread groove 31, a notch 33, and a return hole 35. As illustrated in FIG. 4, the second thread groove 31 is, for example, a Gothic arc shape (a shape formed by a combination of two arcs). As illustrated in FIG. 4, the first thread groove 21 of the rack 2 is also, for example, a Gothic arc shape. The ball 4 rolls between the first thread groove 21 and the second thread groove 31. The ball 4 touches points 21a and 21b on the first thread groove 21 and points 31a and 31b on the second thread groove 31. As illustrated in FIG. 4, a groove bottom line C1, a ball visible outline C2, and a ball center line C3 are aligned in a straight line. The groove bottom line C1 is a line drawn by a bottom of the second thread groove 31. The ball visible outline C2 is a line (locus) drawn by a point on a surface of the ball 4 positioned intermediately between the points 31a and 31b. The ball center line C3 is a line (locus) drawn by a center of the ball 4.

The notch 33 is provided on one end face and the other end face of the nut 3. In other words, the nut 3 includes two notches 33. As illustrated in FIG. 5, each notch 33 includes a bottom surface BS which is a surface orthogonal to the rotation axis Z, an auxiliary bottom surface AS which is parallel to the bottom surface BS and deviates from the bottom surface BS in the axial direction, and a lateral surface LS which is a surface orthogonal to the bottom surface BS. A portion of the notch 33 corresponding to the bottom surface BS is deeper in the axial direction than a portion of the notch 33 corresponding to the auxiliary bottom surface AS. The return hole 35 is provided on the bottom surface BS and passes through the nut 3 in the axial direction. The return hole 35 extends from the notch 33 on one end face of the nut 3 to the notch 33 on the other end face thereof.

As illustrated in FIG. 5, the nut 3 includes a first curved surface portion 61, a first planar portion 64, a second curved surface portion 69, and a second planar portion 66 on the lateral surface LS. The first curved surface portion 61 is a curved surface orthogonal to the bottom surface BS and connected to the second thread groove 31. FIG. 5 is a B-B section in FIG. 4, in other words, a section obtained by cutting the nut 3 with a plane orthogonal to the axial direction and passing through the second thread groove 31 and the notch 33. More specifically, FIG. 5 is a section obtained by cutting the nut 3 with a plane orthogonal to the axial direction and passing through an end of the bottom of the second thread groove 31. In the section illustrated in FIG. 5, the first curved surface portion 61 draws an arc centered at a point P61. The point P61 is positioned outside the second thread groove 31 in a radial direction around the rotation axis Z (hereinafter simply referred to as the radiation direction). A point P611 at one end of the first curved surface portion 61 is positioned on the groove bottom line C1. A tangent line L1 of the first curved surface portion 61 passing through the point P611 is equal to a tangent line L2 of the groove bottom line C1 passing through the point P611. This means that the point P61 which is a center of the first curved surface portion 61, the point P611 which is an intersection between the first curved surface portion 61 and the groove bottom line C1, and a point PZ on the rotation axis Z are on a straight line.

The first planar portion 64 is a plane orthogonal to the bottom surface BS and connected to the first curved surface portion 61. As illustrated in FIG. 5, one end of the first planar portion 64 overlaps a point P612 at the other end of the first curved surface portion 61. The point P612 is an end of the first curved surface portion 61 away from the second thread groove 31. A point P642 at an end of the first planar portion 64 away from the first curved surface portion 61 is positioned on a circle drawn by the return hole 35. A tangent line L3 of the first curved surface portion 61 passing through the point P612 is equal to a tangent line L4 of the return hole 35 passing through the point P642. The tangent line L3 overlaps the first planar portion 64.

The second curved surface portion 69 is a curved surface orthogonal to the bottom surface BS. The second curved surface portion 69 is positioned on a side opposite to the first curved surface portion 61 and the first planar portion 64 across the return hole 35. As illustrated in FIG. 5, the second curved surface portion 69 draws an arc centered at a point positioned outside the second thread groove 31 in the radial direction, but is not disposed between the second thread groove 31 and the return hole 35, which is a point different from the first curved surface portion 61.

The second planar portion 66 is a plane orthogonal to the bottom surface BS and positioned on a side opposite to the first curved surface portion 61 and the first planar portion 64 across the bottom surface BS. The second planar portion 66 is connected to the inner peripheral surface of the nut 3. As illustrated in FIG. 5, a straight line L5 including the second planar portion 66 intersects the tangent line L3 (the tangent line L4). In other words, the straight line L5 is not parallel to the tangent line L3 (the tangent line L4). It is preferred that an angle $\theta$ formed by the straight line L5 and the tangent line L3 (the tangent line L4) be equal to or less than 45°.

As illustrated in FIG. 3, the nut 3 includes a first concave portion 71 and a second concave portion 72 on the bottom surface BS. The first concave portion 71 is, for example, a plane orthogonal to the axial direction. The first concave portion 71 is disposed around an edge of the return hole 35. For example, the first concave portion 71 surrounds the return hole 35 over an entire circumference thereof when viewed from the axial direction. In brief, the return hole 35 is provided on the bottom surface of the first concave portion 71. The second concave portion 72 is, for example, a plane orthogonal to the axial direction. The second concave portion 72 is disposed at an end of the bottom surface BS on a side of the second thread groove 31.

The ball screw device 1 includes an end deflector 5 illustrated in FIG. 6. The end deflector 5 fits into the notch 33 of the nut 3 as illustrated in FIG. 7. The end deflector 5 is a member for guiding the ball 4 reaching an end of the second thread groove 31 to the return hole 35. The ball 4 reaching the end of the second thread groove 31 reaches the return hole 35 through a passage 36 (see FIG. 7) formed between the notch 33 and the end deflector 5. The end deflector 5 is also a member for guiding the ball 4 coming out from the return hole 35 to the end of the second thread groove 31. The ball 4 coming out from the return hole 35 reaches the end of the second thread groove 31 through the passage 36. For example, when the nut 3 rotates in a certain direction, one end deflector 5 guides the ball 4 from the second thread groove 31 to the return hole 35, and the other end deflector 5 guides the ball 4 coming out from the return hole 35 to the second thread groove 31.

As illustrated in FIG. 6, the end deflector 5 includes a base 50, a projection 59, a first arm 51, and a second arm 52. The base 50 overlaps the return hole 35 in the axial direction. The base 50 includes a first convex portion 501 on an end face 505 on a side facing the bottom surface BS of the notch 33. The first convex portion 501 fits into the first concave portion 71 of the notch 33. The projection 59 protrudes from the base 50 toward a side opposite to the second thread groove 31. The projection 59 touches the auxiliary bottom surface AS and the second curved surface portion 69 of the notch 33. As a result, the end deflector 5 is stabilized (difficult to deviate).

The first arm 51 protrudes from the base 50 toward the second thread groove 31. The first arm 51 includes a curved surface portion 51a along the first curved surface portion 61 of the notch 33. The second arm 52 protrudes from the base 50 toward the second thread groove 31. A space is provided between the first arm 51 and the second arm 52. The second arm 52 includes a curved surface portion 52a along the first curved surface portion 61 of the notch 33. The second arm 52 includes a second convex portion 522 on the side facing the bottom surface BS of the notch 33. The second convex portion 522 fits into the second concave portion 72 of the notch 33.

Figure 8:
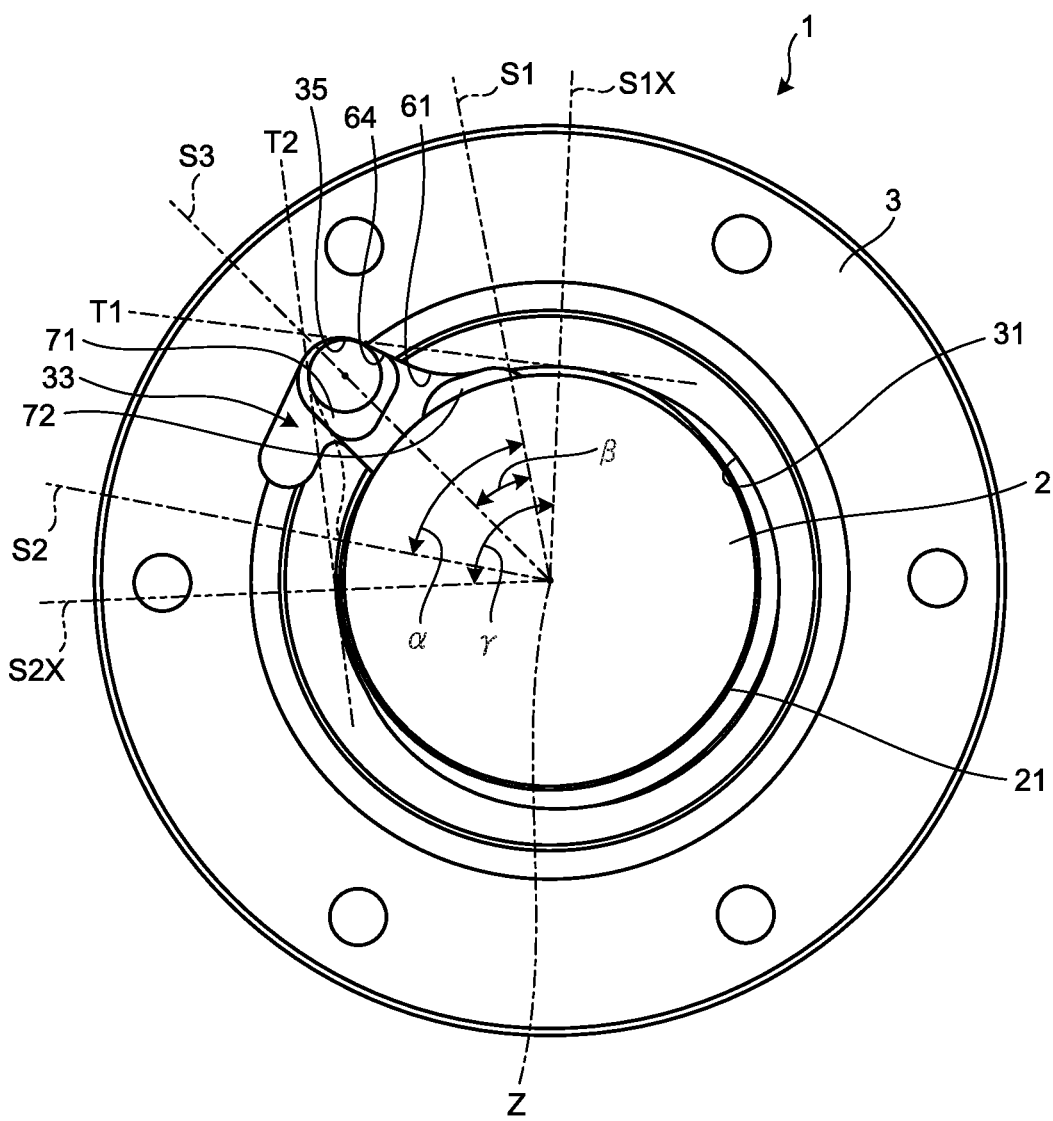
FIG. 8 is a front view for illustrating a range where a ball moves away from a second thread groove.

FIG. 8 is a front view for illustrating a range where a ball moves away from a second thread groove. The second thread groove 31 has a spiral shape around the rotation axis Z. Therefore, the number of the balls 4 increases with the increasing number of windings of a spiral. A load applied to one ball 4 decreases with the increasing number of the balls 4. On the other hand, each ball 4 does not touch the second thread groove 31 when passing through the passage 36 (see FIG. 7) and the return hole 35. This means that the ball 4 moves away from the second thread groove 31 with no load applied to the ball 4. When the number of the balls 4 in a range where the balls 4 move away from the second thread groove 31 increases, a load applied to one ball 4 increases. When the range where the ball 4 moves away from the second thread groove 31 is reduced, the number of the balls 4 subjected to a load increases, which results in a decrease in a load applied to one ball 4. When a load applied to the ball 4 is large, a life of the ball screw device 1 is shortened. Therefore, it is preferred that the range where the ball 4 moves away from the second thread groove 31 be small.

As illustrated in FIG. 8, the range where the ball 4 moves away from the second thread groove 31 is a range delimited by planes S1 and S2. The plane S1 is a plane including the rotation axis Z and passing through a point at which the ball 4 moves away from the second thread groove 31. The plane S2 is a plane including the rotation axis Z and passing through a point at which the ball 4 starts touching the second thread groove 31. An angle α formed by the planes S1 and S2 is twice an angle β formed by the plane S1 and a plane S3. The plane S3 is a plane including the rotation axis Z and passing through a center of the return hole 35.

When a cutout is formed in a linear shape, there is a limit to reducing a range where a ball moves away from a thread groove. A range where a ball moves away from a thread groove when a cutout is formed in a linear shape is a range delimited by planes S1X and S2X as illustrated in FIG. 8. The plane S1X is a plane including the rotation axis Z and passing through an intersection of a circle drawn by the second thread groove 31 and a straight line T1 when viewed from the axial direction. The straight line T1 is a common tangent line between the circle drawn by the return hole 35 and the circle drawn by the second thread groove 31 when viewed from the axial direction. The plane S2X is a plane including the rotation axis Z and passing through an intersection of the circle drawn by the second thread groove 31 and a straight line T2 when viewed from the axial direction. The straight line T2 is a straight line symmetrical to the straight line T1 with respect to the plane S3. In the present embodiment, the nut 3 with the first curved surface portion 61 reduces the range where the ball 4 moves away from the second thread groove 31 compared with when a cutout is formed in a linear shape. In other words, the angle α formed between the planes S1 and S2 is smaller than an angle γ formed between the planes S1X and S2X. Therefore, in the ball screw device 1 according to the present embodiment, the life tends to be long (a load capacity tends to be large). In addition, the end deflector 5 tends to be small compared with when a cutout is formed in a linear shape. The first arm 51 and the second arm 52 are shortened, and thus durability of the end deflector 5 is improved. Besides, it becomes easier to manufacture the end deflector 5.

The ball screw device 1 need not necessarily be used for the electric power steering device 80. The ball screw device 1 can be widely applied to a device required to convert a rotary movement into a translatory movement.

In the section illustrated in FIG. 5, the tangent line L1 at an end of the first curved surface portion 61 need not be equal to a tangent line of the groove bottom line C1. For example, as in second and third modifications described later, a tangent line at an end of the first curved surface portion 61 need not coincide with a tangent line of the groove bottom line C1.

In the section illustrated in FIG. 5, the first curved surface portion 61 need not necessarily draw an arc centered at the point P61 over an entire length. It is only necessary that the first curved surface portion 61 includes at least a portion that draws an arc centered at a point positioned outside the second thread groove 31 in the radial direction. For example, the first curved surface portion 61 may include a plurality of arcs with different centers.

As explained above, the ball screw device 1 includes the screw shaft (the rack 2), the nut 3, the plurality of balls 4, and the end deflector 5. The screw shaft has the first thread groove 21 on the outer peripheral surface. The nut 3 has the second thread groove 31 provided on the inner peripheral surface, the notch 33 provided on the end face, and the return hole 35 provided on the bottom surface BS of the notch 33 orthogonal to the axial direction and passing through in the axial direction. The plurality of balls 4 rolls between the first thread groove 21 and the second thread groove 31. The end deflector 5 fits into the notch 33. The nut 3 includes a curved surface portion (the first curved surface portion 61) at a position of the lateral surface LS of the notch 33 between the second thread groove 31 and the return hole 35. In a first section (the section in FIG. 5) obtained by cutting the nut 3 with a plane orthogonal to the axial direction and passing through the second thread groove 31 and the notch 33, the curved surface portion (the first curved surface portion 61) includes a portion that draws an arc centered at the point P61 positioned outside the second thread groove 31 in the radial direction.

If the screw shaft rotates and the nut 3 goes straight, disposing the notch 33 to be positioned on an upper side in a vertical direction can always move each ball 4 toward the screw shaft due to its own weight. This prevents the ball 4 from colliding with an edge of the second thread groove 31. However, when the nut 3 rotates and the screw shaft goes straight as in the present embodiment, a position of the notch 33 cannot be fixed. In contrast, in the ball screw device 1 according to the present embodiment, the curved surface portion (the first curved surface portion 61) is included, thereby moving the ball 4 toward the first thread groove 21 by the curved surface portion (the first curved surface portion 61) when the ball 4 enters the second thread groove 31 from the side of the notch 33. Thus, the ball 4 touches the first thread groove 21 before entering the second thread groove 31 from the side of the notch 33 and is guided to the first thread groove 21. The ball 4 guided to the first thread groove 21 passes through a middle of the first thread groove 21. This suppresses collision between the ball 4 and an edge of the nut 3. Therefore, the ball screw device 1 can smooth a movement of the ball 4. The ball screw device 1 can also suppress generation of sound due to the collision of the ball 4.

In the ball screw device 1, the nut 3 includes the first concave portion 71 around the edge of the return hole 35 of the bottom surface BS. This results in smooth movements when the ball 4 goes in and out of the return hole 35.

In the ball screw device 1, the nut 3 includes the second concave portion 72 at the end of the bottom surface BS on the side of the second thread groove 31. This increases thickness of a portion of the end deflector 5 (the second arm 52), corresponding to the second concave portion 72. Therefore, durability of the end deflector 5 is improved.

In the first section (the section in FIG. 5), a first tangent line (the tangent line L3) which is a tangent line at the end (a point P612) of the curved surface portion (the first curved surface portion 61) on a side away from the second thread groove 31 is equal to the tangent line L4 of the return hole 35. This results in smooth movements of the ball 4 from the curved surface portion (the first curved surface portion 61) toward the return hole 35 and from the return hole 35 toward the curved surface portion (the first curved surface portion 61).

In the ball screw device 1, the nut 3 includes a planar portion (the second planar portion 66) positioned on the side opposite to the curved surface portion (the first curved surface portion 61) of the lateral surface LS of the notch 33 across the bottom surface BS. In the first section (the section in FIG. 5), the straight line L5 drawn by the planar portion (the second planar portion 66) is not parallel to the first tangent line (the tangent line L3). This makes it easier to dispose the position of the return hole 35 inside in the radial direction. Therefore, it is possible to shorten a distance from the second thread groove 31 to the return hole 35.

The electric power steering device 80 includes the ball screw device 1. Thus, the electric power steering device 80 can smooth a movement of a member (the rack 2) to which an auxiliary steering force is transmitted.

First Modification

Figure 9:
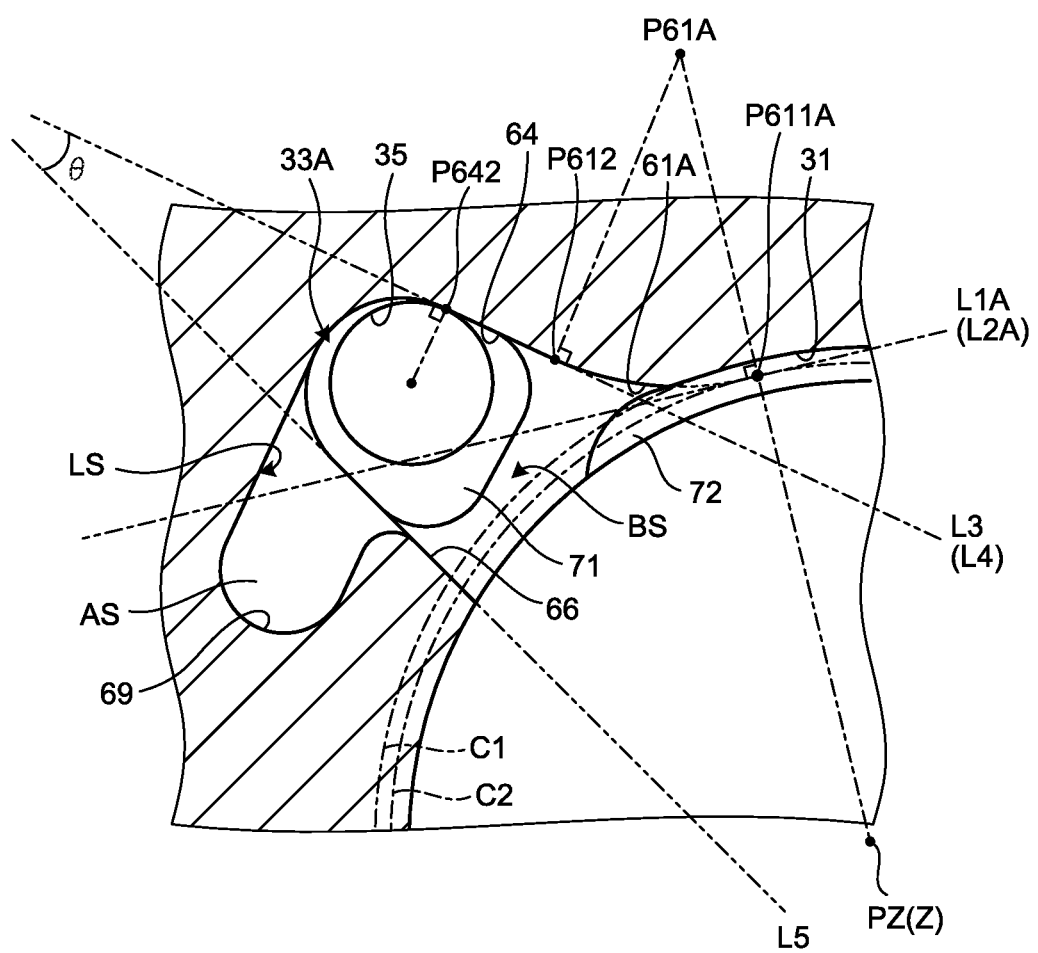
FIG. 9 is a sectional view corresponding to a B-B section in FIG. 4 according to a first modification.

FIG. 9 is a sectional view corresponding to the B-B section in FIG. 4 according to a first modification. Components identical to those explained in the embodiment bear identical signs, and overlapping explanations will be omitted.

A notch 33A according to the first modification has a first curved surface portion 61A different from the above described first curved surface portion 61 in shape. One end of the first curved surface portion 61A is connected to the second thread groove 31. In a section illustrated in FIG. 9, the first curved surface portion 61A draws an arc centered at a point P61A. The point P61A is positioned outside the second thread groove 31 in the radial direction. A point P611A on an extended line of the first curved surface portion 61A is positioned on a ball visible outline C2. A tangent line L1A of the first curved surface portion 61A passing through the point P611A is equal to a tangent line L2A of the ball visible outline C2 passing through the point P611A. In other words, the point P61A which is a center of the first curved surface portion 61A, the point P611A which is an intersection of the first curved surface portion 61A and the ball visible outline C2, and the point PZ on the rotation axis Z are on a straight line.

Second Modification

Figure 10:
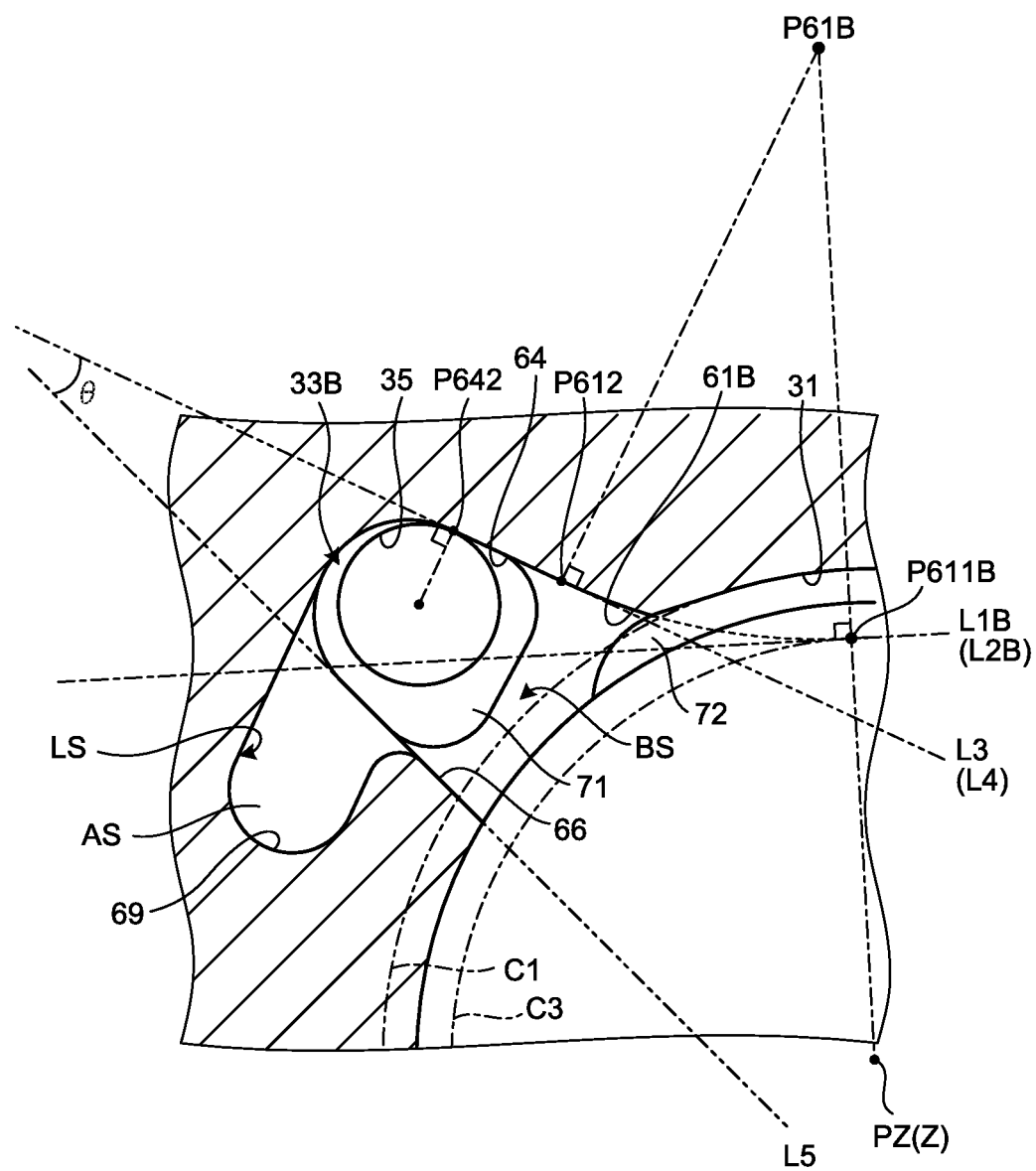
FIG. 10 is a sectional view corresponding to the B-B section in FIG. 4 according to a second modification.

FIG. 10 is a sectional view corresponding to the B-B section in FIG. 4 according to a second modification. Components identical to those explained in the embodiment bear identical signs, and overlapping explanations will be omitted.

A notch 33B according to the second modification has a first curved surface portion 61B different from the above described first curved surface portion 61 in shape. One end of the first curved surface portion 61B is connected to the second thread groove 31. In a section illustrated in FIG. 10, the first curved surface portion 61B draws an arc centered at a point P61B. The point P61B is positioned outside the second thread groove 31 in the radial direction. A point P611B on an extended line of the first curved surface portion 61B intersects the ball center line C3. A tangent line L1B of the first curved surface portion 61B passing through the point P611B is equal to a tangent line L2B of the ball center line C3 passing through the point P611B. In other words, the point P61B which is a center of the first curved surface portion 61B, the point P611B which is an intersection of the first curved surface portion 61B and the ball center line C3, and the point PZ on the rotation axis Z are on a straight line.

Third Modification

Figure 11:
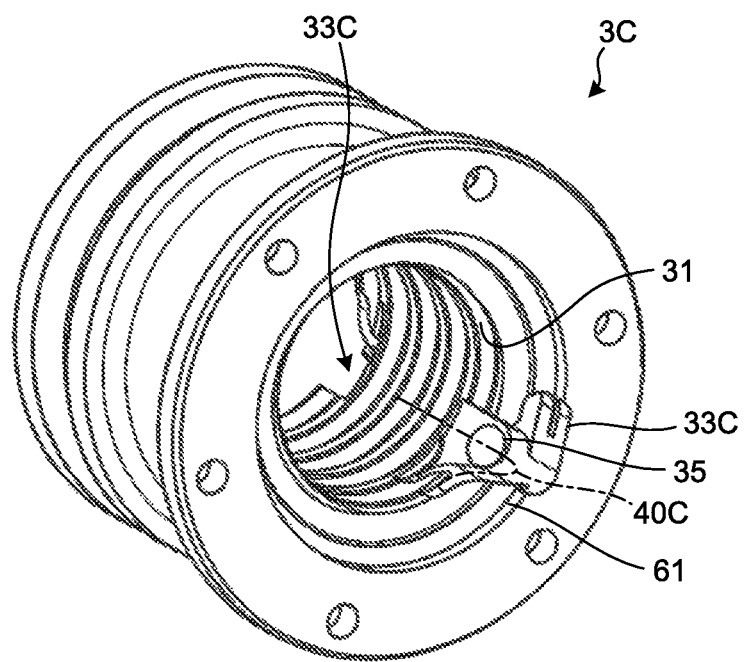
FIG. 11 is a perspective view of a nut according to a third modification.
Figure 12:
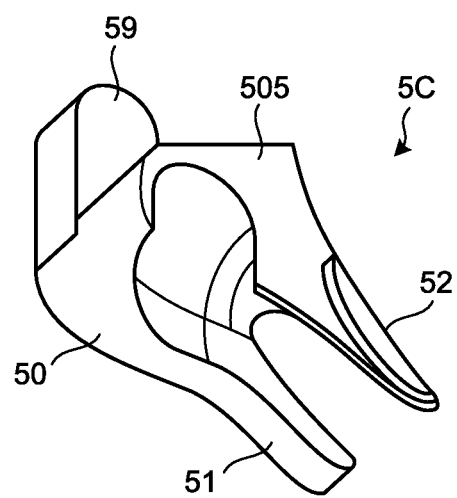
FIG. 12 is a perspective view of an end deflector according to the third modification.

FIG. 11 is a perspective view of a nut according to a third modification. FIG. 12 is a perspective view of an end deflector according to the third modification. Components identical to those explained in the embodiment bear identical signs, and overlapping explanations will be omitted.

As illustrated in FIG. 11, a nut 3C according to the third modification does not have the above described first concave portion 71 and the above described second concave portion 72 in a notch 33C. An end deflector 5C according to the third modification does not have the above described first convex portion 501 and the above described second convex portion 522. This makes it easier to manufacture the nut 3C and the end deflector 5C. In the third modification, a curvature radius of a locus 40C drawn by the center of the ball 4 when the ball 4 passes through the edge of the return hole 35 is, for example, 0.7 times a diameter of the ball 4.

Fourth Modification

Figure 13:
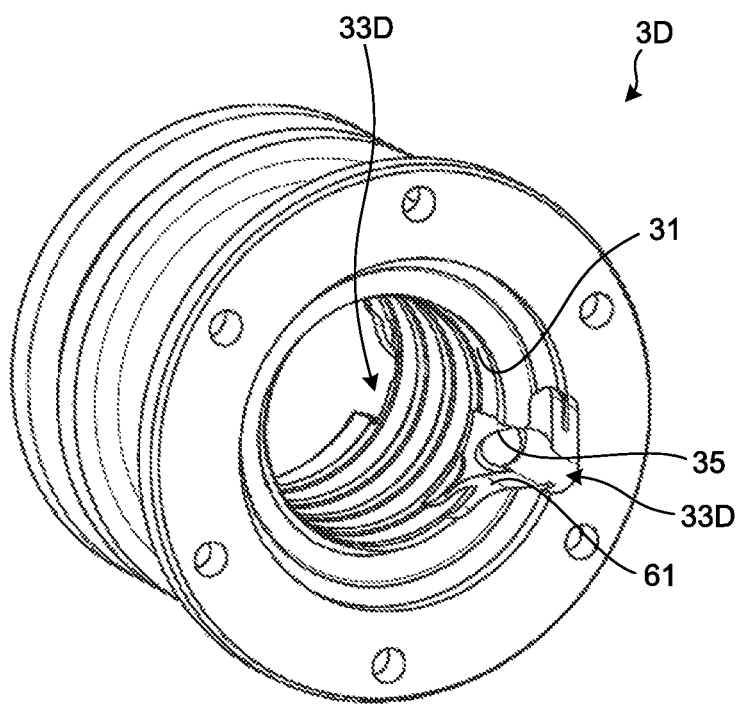
FIG. 13 is a perspective view of a nut according to a fourth modification.
Figure 14:
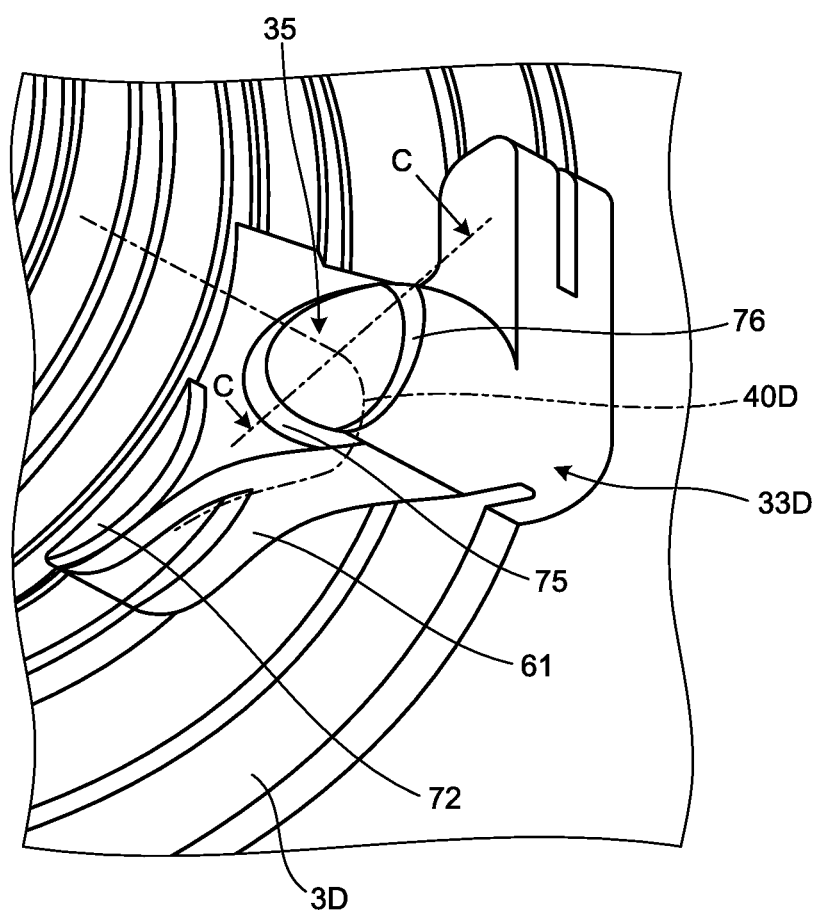
FIG. 14 is an enlarged perspective view of a notch of a nut according to the fourth modification.
Figure 15:
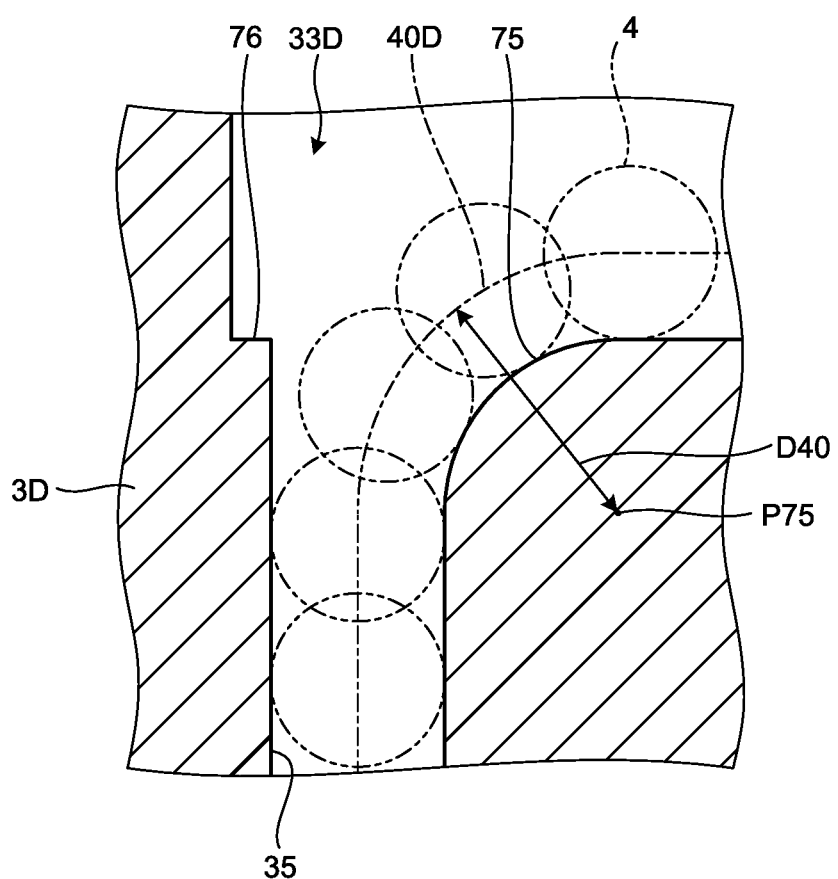
FIG. 15 is a C-C sectional view in FIG. 14.
Figure 16:
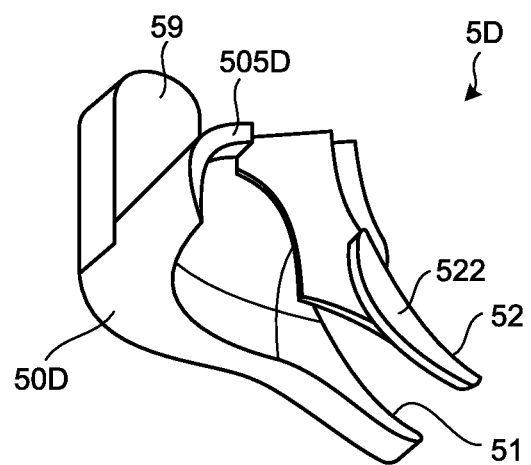
FIG. 16 is a perspective view of an end deflector according to the fourth modification.

FIG. 13 is a perspective view of a nut according to a fourth modification. FIG. 14 is an enlarged perspective view of a notch of the nut according to the fourth modification. FIG. 15 is a C-C sectional view in FIG. 14. FIG. 16 is a perspective view of an end deflector according to the fourth modification. Components identical to those explained in the embodiment bear identical signs, and overlapping explanations will be omitted.

As illustrated in FIG. 13, a nut 3D according to the fourth modification includes a first concave portion 75 on the bottom surface BS of a notch 33D. FIG. 15 is the C-C section in FIG. 14, in other words, a section obtained by cutting the nut 3D with a plane orthogonal to the bottom surface BS and passing through the center of the return hole 35. In the section illustrated in FIG. 15, a surface of the first concave portion 75 draws an arc centered at a point P75 positioned inside the return hole 35 in the radial direction. As illustrated in FIG. 15, a curvature radius D40 of a locus 40D drawn by the center of the ball 4 when the ball 4 passes through the surface of the first concave portion 75 is, for example, 1.5 times the diameter of the ball 4. It is preferred that the curvature radius D40 be greater than 0.7 times and equal to or less than 1.5 times the diameter of the ball 4.

In a base 50D of an end deflector 5D according to the fourth modification, an end face 505D is smaller than the above described end face 505. In the base 50D, a portion overlapping the first concave portion 75 in the axial direction is notched. The end face 505D touches a positioning face 76 illustrated in FIGS. 14 and 15. The positioning face 76 is a part of the bottom surface BS.

As described above, in the fourth modification, in a second section (the section in FIG. 15) obtained by cutting the nut 3D with a plane orthogonal to the bottom surface BS and passing through the center of the return hole 35, the surface of the first concave portion 75 includes a portion that draws an arc centered at a point P75 positioned inside the return hole 35 in the radial direction. This leads to smoother movements of the ball 4 from the curved surface portion (the first curved surface portion 61) toward the return hole 35 and from the return hole 35 toward the curved surface portion (the first curved surface portion 61).

REFERENCE SIGNS LIST

1 BALL SCREW DEVICE
2 RACK (SCREW SHAFT)
21 FIRST THREAD GROOVE
3 NUT
31 SECOND THREAD GROOVE
33 NOTCH
35 RETURN HOLE
36 PASSAGE
4 BALL
5 END DEFLECTOR
50 BASE
501 FIRST CONVEX PORTION
51 FIRST ARM
52 SECOND ARM
522 SECOND CONVEX PORTION
59 PROJECTION
61 FIRST CURVED SURFACE PORTION
64 FIRST PLANAR PORTION
66 SECOND PLANAR PORTION
69 SECOND CURVED SURFACE PORTION
71 FIRST CONCAVE PORTION
72 SECOND CONCAVE PORTION
80 ELECTRIC POWER STEERING DEVICE
81 STEERING WHEEL
82 STEERING SHAFT
84 UNIVERSAL JOINT
85 LOWER SHAFT
86 UNIVERSAL JOINT
87 PINION SHAFT
88 PINION
89 TIE ROD
90 ECU
93 ELECTRIC MOTOR
94 TORQUE SENSOR
95 VEHICLE SPEED SENSOR
98 IGNITION SWITCH
99 POWER SUPPLY DEVICE
AS AUXILIARY BOTTOM SURFACE
BS BOTTOM SURFACE
C1 GROOVE BOTTOM LINE
C2 BALL VISIBLE OUTLINE
C3 BALL CENTER LINE
LS LATERAL SURFACE
Z ROTATION AXIS

The invention claimed is:

1. A ball screw device comprising:
a screw shaft that has a first thread groove on an outer peripheral surface;
a nut that has a second thread groove provided on an inner peripheral surface, a notch provided on an end face, and a return hole provided in a bottom surface of the notch orthogonal to an axial direction of the screw shaft and passing through in the axial direction;
a plurality of balls that roll between the first thread groove and the second thread groove; and
an end deflector that fits into the notch,
wherein
the nut comprises a curved surface portion at a position of a lateral surface of the notch between the second thread groove and the return hole,
in a first section obtained by cutting the nut with a plane orthogonal to the axial direction and passing through the second thread groove and the notch, the curved surface portion includes:
an arc portion that draws an arc centered at a point positioned outside the second thread groove in a radial direction around a rotation axis of the nut; and
a first end point located at one end of the arc portion on a groove bottom curved line and
in the first section, a first tangent line that is a tangent line of the curved surface portion passing through the first end point is a second tangent line that is a tangent line of the groove bottom curved line passing through the first end point.

2. The ball screw device according to claim 1, wherein the nut comprises a first concave portion around an edge of the return hole of the bottom surface.

3. The ball screw device according to claim 2, wherein a surface of the first concave portion includes, in a second section obtained by cutting the nut with a plane orthogonal to the bottom surface and passing through a center of the return hole, a portion that draws an arc centered at a point positioned inside the return hole in the radial direction.

4. The ball screw device according to claim 1, wherein the nut comprises a second concave portion at an end of the bottom surface on a side of the second thread groove.

5. The ball screw device according to claim 1, wherein the curved surface portion further includes a second end point on a circle of the return hole at a side away from the second thread groove,
in the first section, a third tangent line that is a tangent line of the curved surface portion passing through the second end point, is equal to a fourth tangent line that is a tangent line of the return hole passing through the second end point.

6. The ball screw device according to claim 5, wherein the nut comprises a planar portion positioned on a side opposite to the curved surface portion of a lateral surface of the notch across the bottom surface,
a straight line including the planar portion is not parallel to the third tangent line in the first section,
an angle formed by the straight line and the third tangent line is equal to or less than 45° such that the straight line and the third tangent line is apart toward a direction to the rotation axis of the nut.

7. An electric power steering device comprising the ball screw device according to claim 1.

* * * * *